March 17, 1970  C. A. GOVATSOS  3,501,080

TRAY FOR HOLDING ARTICLES

Filed July 30, 1968

INVENTOR.
CHARLES A. GOVATSOS
BY
Kenway, Jenney + Hildreth
ATTORNEYS

United States Patent Office 3,501,080
Patented Mar. 17, 1970

3,501,080
TRAY FOR HOLDING ARTICLES
Charles A. Govatsos, Wellesley, Mass., assignor to Bestpak, Inc., Natick, Mass., a corporation of Massachusetts
Filed July 30, 1968, Ser. No. 748,834
Int. Cl. B65d 1/36, 1/00
U.S. Cl. 229—15
8 Claims

ABSTRACT OF THE DISCLOSURE

The invention is a one-piece tray molded from synthetic plastics, the tray being either a single or plural pocket structure, each pocket being formed by a plurality of sidewalls and a bottom, the meeting corners of the sidewalls being rounded outwardly, and the top edges of the sidewalls being flared upwardly and outwardly. Each sidewall bows inwardly, and is provided with vertical corrugations to provide resiliency in holding articles in the pockets.

BACKGROUND OF INVENTION

In the art of trays for holding articles, particularly plural pockets trays for holding chocolates in a box thereof, several problems have been encountered: In view of the large numbers of such trays that are in use today, and the competition in respect to their sales, the cost or selling price of the trays becomes an important factor. As a result the cost of the plastic itself becomes very important. Therefore, in making the trays, as little plastic is used as can be, while still producing a saleable item. Because of this, there is a tendency for the material in certain parts of the tray (such as the corners where the sidewalls meet, and the edges where the botom is joined to the sidewalls) to become so thin that during the molding operation or in latter usage these parts become broken away from each other, with the result that the resulting tray cannot be sold or used since it is defective.

In the molding of such trays by thermo-forming, one of the serious problems occurs in getting a proper flow of the plastic material from the top edge of what eventually will be the finished tray down to the bottom itself. Due to the fact that during the forming the resin first contacts that portion of the mold which will be the top edges of a pocket, the plastic material tends to be chilled at that point, with the result that here the chilled material does not flow readily and thus stays relatively thick. However, as the material is drawn down into the mold either by a plunger or by an air pressure, the material gets thinner and thinner as it approaches the bottom of the pocket. If the flow of material is not correctly provided, then again the material may break out at the aforesaid corners and at the bottom. As a result of this, there is necessary an extremely careful control of the temperatures of forming and the flow of material, otherwise the yield of good products from a given manufacturing line will be so low as to make the operation non-profitable.

Both of the above problems are particularly vexations in respect to trays having a plurality of pockets.

Another problem in the art occurs in the use of such trays, regardless of whether they are single pocket trays or plural pocket trays. When such trays, generally the plural pocket type, are used for holding chocolates, the trays then being mounted in a box, it is desirable that the chocolates be prevented from rattling around in the pockets. Also, if the box of chocolates should be turned upside down, it is desirable that the chocolates be held within the pockets themselves. That such a box of chocolates may be turned upside down is understandable, when it is realized that chocolates are generally shipped to a retail seller in cartons, and during the handling of such cartons either by freight or by truck, the whole carton may become turned upside down. If this does occur and the chocolates fall out of the pockets, then when the box is uprighted, there is no guarantee that the chocolates will fall back into the pockets so that the top of the chocolate is facing upward. As a result, when the consumer buys the box and first opens it, instead of seeing a neat array of chocolates in the box, they are lying helter-skelter disarray, which does not present a very pleasing appearance. Therefore, it is highly desirable that a tray be used which holds the chocolates firmly enough within the pockets so that they do not fall out, if the box of chocolates should be upset or turned upside down, yet at the same time do not become marred or disfigured by the holding means.

Still another problem rises from the fact that in modern mass production methods of chocolates manufacture, the chocolates are loaded into the supporting trays by automatic machinery, this being more economical, and of course, more sanitary. In art hitherto known, when such automatic filling of the pockets in a plural pocket tray has been accomplished, it has been found that it is at times difficult for the automatic machinery to sense when the tray is accurately beneath the filling mechanism, with the result that the chocolate either does not enter the pocket correctly; or by being forced into the pocket, it becomes damaged. Therefore, one of the very desirable characteristics of single or plural pocket trays which are to be loaded automatically, is to have the tray itself provide means for guiding the chocolate or other article into the pocket of the tray.

Yet another problem in the art is that in the shipping of trays themselves by the manufacture thereof to the one who is going to fill them with chocolates or other articles, shipping costs are high and therefore it is desirable to pack as many boxes as possible within a given space. As a result, it is highly desirable that either single pocket or plural pocket trays be so made that they will nest conveniently together, and that the sidewalls forming the pockets of these trays be sufficiently stiff to avoid crumpling during use, and yet flexible enough in an outward direction so as not to harm the article (such as a chocolate or other fragile food articles) from being harmed.

Summary of Invention

Among the several objects of the invention, therefore, may be noted the provision of single or plural pocket trays for holding articles, preferably fragile articles of food such as chocolate or other candy pieces, in which means are provided for securely holding the article in the pockets of the tray even though the tray may become turned upside down. Another object is to provide a tray of the above kind in which the sidewalls are stiff enough to prevent collapsing during use, and yet are flexible enough in an outward direction so as not to harm the article being held in the tray. A third object of the invention is to provide trays of either of the above kinds in which the tray is so formed that the article being put in the pockets or cavities of the tray will be guided therein. A fourth object of the invention is to provide a design of the tray which makes it more economical and more fool-proof to control the flow of the plastic material during manufacture thereof, in order to minimize, if not eliminate completely, breakthrough at the pocket corners, and yet use a minimum of plastic resin for each tray.

Other objects of the invention will be in part obvious and in part pointed out hereinafter, since it is not intended that the above listing be all-inclusive.

The invention accordingly comprises the elements and combinations of elements, features of construction, and arrangements of parts which will be exemplified in the structures described, and the scope of the application of which will be indicated in the appended claims.

In the accompanying drawings, in which one of the various possible embodiments of the invention is illustrated:

In the drawings, similar reference characters indicate corresponding parts, and the dimension of certain of the parts as shown in the drawings may have been modified and/or exaggerated for purposes of clarity of illustration and understanding of the invention.

Figure 1:
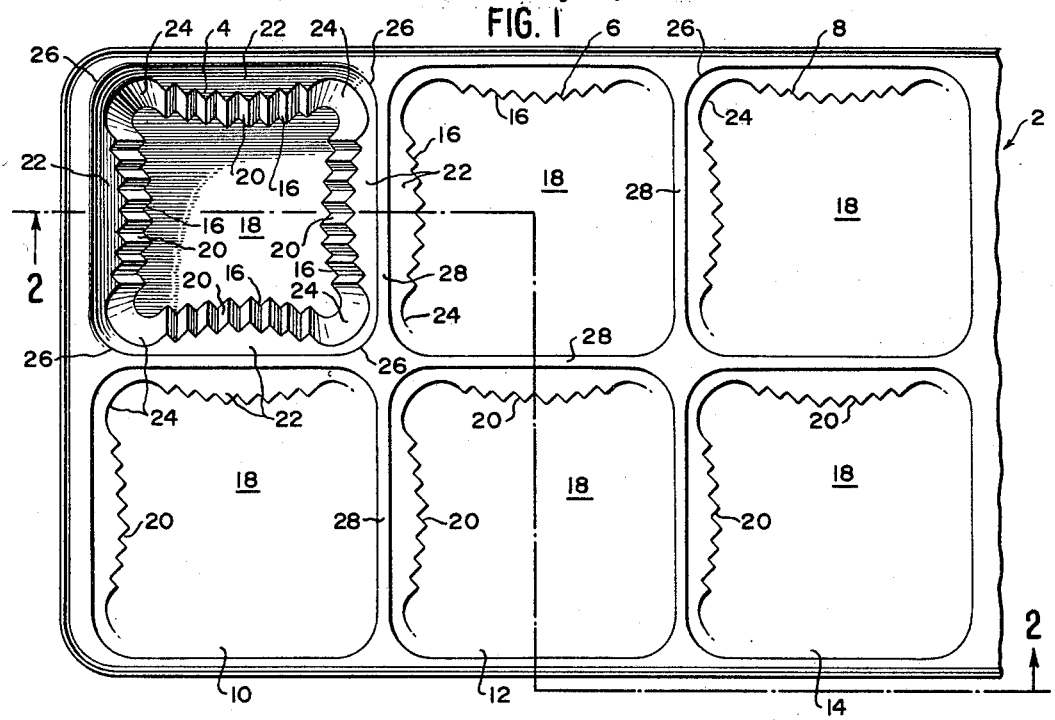
FIG. 1 is a plan view of a portion of a tray having a plurality of pockets therein.
Figure 2:
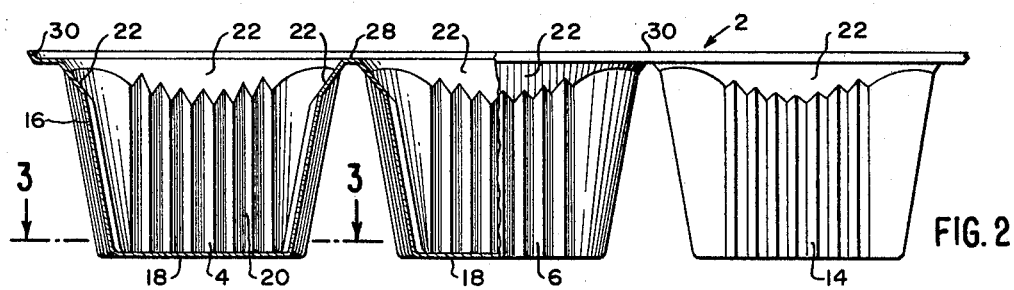
FIG. 2 is an elevation, partly in section, of the embodiment of FIG. 1.

Referring now to FIG. 1, a portion of a tray, indicated generally by numeral 2, is shown, the figure being of an end portion of the tray. As illustrated, six pockets of substantially identical construction, 4, 6, 8, 10, 12 and 14, are shown, each pocket comprising the sidewalls 16 and the bottom 18. (It is to be noted that in the pockets 6–14 inclusive, the representation of the sidewalls is given somewhat schematically, whereas in the pocket 4, the representation of the construction of the sidewalls is given in full detail.) The drawing is made this way in order to simplify the drawings particularly since in FIG. 2, the construction of the sidewalls of all the pockets is clearly and accurately shown.

Each of the walls has a plurality of vertical corrugations 20, these corrugations are being so formed and arranged that the envelopes (imaginary) that contain the corrugations bow inwardly toward the interior of the pocket 18. That is, each series of corrugations 20 forms an arch or bridge-like structure which lends a greated flexibility in an outward direction, but enhances the stiffness of the sidewall from top to bottom of the pocket. The corrugations 20 of each sidewall start at approximately the bottom 18 of each pocket and extend upwardly to a terminus which is below the top level of the open end of the pocket. At this point, the wall material flares upwardly and outwardly in order to form the sloping shoulders 22, one of these shoulders being provided for each of the walls 16. As a result of this construction, and thinking in terms of each pocket, it is obvious that the sloping shoulders 22 extend inwardly and downwardly of the top, and thus provide a funneling construction which aids and guides the entry of an article (such as a chocolate) into the pocket. If these shoulders are not provided, and the corrugations 16 extended to the very top edge of the open pocket, then it can be seen that a chocolate could strike such as a sharp edge and either be upset as it enters the pocket by being caught on the edge or, if it is held firmly and then shoved downwardly, it would be damaged by the sharp edge. With the sloping shoulders 22, both of these ill effects are avoided, and the article or chololate will be guided centrally into the pockets 4–14 inclusive, and into the other pockets of the tray which are made in similar manner.

As a further feature of the invention, it will be noted that the sidewalls 20 of all of the pockets do not meet in a sharp corner or even a corner with a very short radius of curvature, both of which are customary in the prior art trays. Instead, each of the corners 24 of the sidewalls curves outwardly and has a relatively large radius of curvature. These rounded corners have been found to be necessary in order to provide for easy flow of the material into the corners without breaking out of the corners such as might be found if the usual kind of very short radius corners, or sharp corners, were used. That is, the sharper the corner, the less that material will flow into the corners, with the result that too little material will flow and thus either a proper continuous joint will not be made, or the material will break away at these corners in use. With the extended outward curvature 24 as shown, it is found that flow takes place more readily, uniformly and evenly with the result that the loss due to imperfect corners has been greatly reduced if not completely eliminated. It will be noticed that in the drawings, the corners 24 extend upwardly and intersect the sloping shoulders 22 at a point just below the very top edge or lip of the pockets. However, it has been found in practice, that instead of terminating just short of this lip, the corners 24 can merge or flair into the edges indicated by numeral 26 of the tray.

The description given above is applicable either to a single pocket tray, or a plural pocket tray. The trays, single or plural pocket, are integrally molded of moldable resin such as styrene, vinyl polymers, acrylic polymers, and so forth, such as is customary to use for a thermoforming or molding operation. In view of the fact that thermo-forming is a well known art, a description thereof will not be given herein, since it can be stated that ordinary methods of doing thermo-forming where relatively deep cups such as those shown in the drawings herein are to be made, can be easily used because of the above-described configurations.

In the embodiment shown in FIG. 1, each of the separate pockets is joined by a bridging or connecting piece 28 so that all of the pockets are joined together, the entire structure thus making a single plural-pocket tray which is useful, for example, in packing chocolates in layers in a box of chocolates. If desired, a lip 30 may be provided around the entire outer rim of the complete tray for stiffness purposes.

Figure 3:
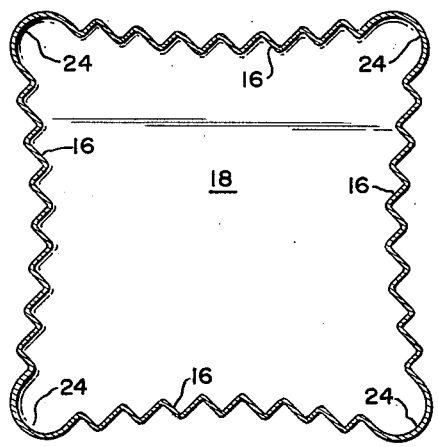
FIG. 3 is a sectional plan view of one pocket of the aforesaid tray, taken in the direction of sight lines 3—3 on FIG. 2.

The illustration of FIG. 3 is given to show how the corners 24 extend downwardly to meet the bottom 18 of each pocket.

In the construction of the box trays and in accordance with the invention, the following matters should be pointed out. The corrugations 20 may be either pointed or rounded.

In typical trays made in accordance with this invention, the thickness of the material in the finished tray preferably becomes thinner as one goes from top to bottom of the pockets, thereby providing a greater flexibility in the lower portion of the sidewalls. This permits the sidewalls to expand more readily to facilitate locking the held article in the pocket.

The depth of the corrugations 20 can be a matter of choice depending upon the amount of rigidity desired in the sidewalls 16, from top to bottom, and the amount of flexibility in an outward direction. As examples, success has been obtained with 7 to 9 corrungations per inch of sidewall, the corrugations being approximately 0.030 inch to 0.070 inch in trough depth. The angle that the sidewalls make with the perpendicular is a matter of choice, but success has been obtained for convenient nesting purposes, with an angle as low as 5° to the vertical. The radius of curvature of the corner 24 may be, for example, $3/16$ of an inch; and the corner may taper slightly in size as it extends from top to bottom, for example, having a radius of curvature of $3/16$ inch at the top, and $1/8$ inch at the bottom.

The embodiment shown illustrates a tray having pockets or compartment which are approximately square in shape. Obviously, other polygonal shapes can be used such as, for example, rectangular, triangular or hexagonal.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Having described the invention, what is claimed is:

1. A tray for holding an article, the tray having a one-piece integral molded construction, and comprising a plurality of sidewalls, a bottom, and upper edge portions, to form at least one open pocket for receiving the article; each sidewall being provided with resilient means for holding the article in the pocket and each sidewall being joined to adjacent sidewalls of the same pocket by corner elements outwardly curved throughout their lengths; and each upper edge portion of a pocket sloping upwardly and outwardly with respect to the respective sidewall of the pocket to provide inwardly and downwardly sloping guide surfaces facilitating the placing of said article in the pocket.

2. The tray of claim 1 in which the material comprising the tray is heaviest at said edge portions and becomes progressively thinner in a direction toward the bottom of the pocket.

3. The tray of claim 1 in which said resilient means comprises a plurality of vertical corrugations in said sidewalls.

4. The tray of claim 3 in which each of the imaginary envelopes enclosing said corrugations in each sidewall projects inwardly into said pocket, thereby to provide a flexible, arched, bridge-like structure for engaging said article.

5. The tray of claim 4 in which each of said sidewalls slopes inwardly from the top of the pocket to the bottom, thereby facilitating nesting of one tray in another.

6. A tray for holding a plurality of articles, the tray having a one-piece integral molded construction and a plurality of pockets therein throughout the tray, each of the pockets being formed by a plurality of sidewalls and a bottom, the sidewalls having upper edge portions and the rims of the edge portions of one pocket being joined to the rims of the edge portions of adjacent pockets; each sidewall being provided with resilient means for holding the article in the respective pocket and each sidewall being joined to adjacent sidewalls of the same pocket by corner elements outwardly curved throughout their lengths; and said upper edge portions extending upwardly and outwardly from the sidewalls to provide inwardly and downwardly sloping guide surfaces facilitating the placing of articles in the pockets.

7. The tray of claim 6 in which the material comprising the tray is heaviest at said edge portions and becomes progressively thinner in a direction toward the bottom.

8. The tray of claim 6 in which said resilient means comprises a plurality of vertical corrugations in said sidewalls, the imaginary envelope enclosing said corrugations in each sidewall projecting inwardly into the respective pocket, thereby to provide a flexible, arched, bridge-like structure for engaging said article.

References Cited

UNITED STATES PATENTS

| | | | |
|---|---|---|---|
| 3,074,582 | 1/1963 | Martelli et al. | 229—2.5 |
| 3,125,275 | 3/1964 | Ehe | 229—15 |
| 3,257,062 | 6/1966 | Whiteford | 229—2.5 |

DAVID M. BOCKENEK, Primary Examiner

U.S. Cl. X.R.

229—2.5